United States Patent
Monia et al.

(10) Patent No.: US 6,751,693 B1
(45) Date of Patent: Jun. 15, 2004

(54) METHODS FOR ASSIGNING ADDRESSES TO EXPANDED DEVICES IN I/O SUBSYSTEM

(75) Inventors: Charles A. Monia, San Jose, CA (US); John S. Packer, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 387 days.

(21) Appl. No.: 09/798,278

(22) Filed: Mar. 2, 2001

(51) Int. Cl.$^7$ .............. G06F 13/00; G06F 3/00; G06F 1/24
(52) U.S. Cl. .............. 710/104; 710/8; 713/100
(58) Field of Search .............. 710/307, 312, 710/8, 9, 15, 104; 713/1, 100

(56) References Cited

U.S. PATENT DOCUMENTS

| | | | |
|---|---|---|---|
| 5,745,493 A | 4/1998 | St. Clair | 370/438 |
| 5,815,074 A | 9/1998 | Sasagawa et al. | 340/505 |
| 5,925,120 A | 7/1999 | Arp et al. | 710/131 |
| 6,115,772 A | 9/2000 | Crater | 710/129 |
| 6,148,356 A * | 11/2000 | Archer et al. | 710/307 |
| 6,330,630 B1 * | 12/2001 | Bell | 710/312 |
| 6,493,785 B1 | 12/2002 | Galloway | 710/314 |
| 6,510,481 B1 | 1/2003 | Petty | 710/305 |
| 6,546,497 B1 | 4/2003 | Galloway et al. | 713/501 |
| 6,557,064 B1 | 4/2003 | Galloway | 710/260 |

* cited by examiner

Primary Examiner—Tim Vo
(74) Attorney, Agent, or Firm—Martine & Penilla, LLP

(57) ABSTRACT

The present invention provides a method for assigning addresses to expanded devices in a computer I/O subsystem, which has one or more buses. Each bus has an N-bit data bus for communication. One or more types of expanded devices are provided in the computer I/O subsystem and are coupled to one or more peripheral buses. An expanded address space is defined for the one or more types of expanded devices by partitioning an N-bit data bus into a pair of fields that includes an expanded ID field and an expanded signature field. An address is assigned to each of the expanded devices by assigning an expanded signature to each type of the expanded devices. In addition, an expanded ID is assigned to each expanded device within each type of the expanded devices, wherein more than two bits are asserted in the address.

28 Claims, 6 Drawing Sheets

METHODS FOR ASSIGNING ADDRESSES TO EXPANDED DEVICES IN I/O SUBSYSTEM

CROSS REFERENCE TO RELATED APPLICATIONS

This application is related to U.S. patent application Ser. No. 09/798,275 entitled "Automatic Addressing of Expanders in I/O Subsystem" by John S. Packer. This application is also related to U.S. patent application Ser. No. 09/798,100 entitled "I/O Subsystem Topology Discovery Method" by John S. Packer. These applications, filed on the same day as the present application, are incorporated herein by reference.

BACKGROUND OF THE INVENTION

1. Field of the Invention

This invention relates generally to computer I/O subsystems having a peripheral bus, and more particularly to methods for assigning addresses to expanded devices in I/O subsystems.

2. Description of the Related Art

Modern computer systems often utilize one or more buses to connect to peripheral devices to enhance its resources. For example, the resources of a computer system may be substantially increased by connecting the computer system to one or more peripheral devices such as disk drives, tape drives, printers, scanners, optical drives, and the like. These peripheral devices are attached to the computer system by means of a peripheral bus (e.g., cable).

One of the most widely used peripheral buses is the well known small computer systems interface (SCSI) bus, which is defined in conformity with well known SCSI protocols (e.g., SCSI-1, SCSI-2, SCSI-3, etc.), which are incorporated herein by reference. The SCSI protocols are designed to provide an efficient peer-to-peer I/O interface between a host computer and its peripheral devices in a computer system.

FIG. 1 shows a block diagram of a conventional computer system 100 including a host computer 102, a plurality of SCSI devices 106, and a SCSI bus 108. The host computer 102 includes a SCSI host adapter 104 for communicating with the SCSI devices 106. The host adapter 104 in the computer system 100 controls communication between the host computer 102 and the SCSI devices 106. For example, the host adapter 104 provides a physical connection between the computer 102 and the SCSI bus 108. In addition, it is configured to receive data, address, and control signals from the host computer 102 and convert the signals into corresponding SCSI compatible data, address, and control signals. Conversely, the SCSI host adapter 104 is also configured to receive SCSI compatible data, address, and control signals from the SCSI devices 106 through the SCSI bus 108 and convert them into corresponding host-bus compatible data, addressing, and control signals. The SCSI host adapter 104 is well known in the art and may be implemented, for example, by using AIC-7890A™ packaged semiconductor device, which is available from Adaptec Inc., of Milpitas, California.

Under the conventional SCSI specifications, the SCSI bus 108 may connect up to 16 SCSI devices including the host adapter 104 depending on the type of SCSI bus implemented. The SCSI devices 106 may be peripheral devices such as disk drives, tape drives, printers, scanners, optical drives, or any other devices that meet the SCSI specification. The SCSI bus 108 is typically implemented as a cable having a set of parallel wires. For example, the SCSI-1 cable has 50 wires. Of these 50 wires, eight wires are for data, one wire is for parity, nine wires are for control, 25 wires are for ground, and the remaining wires are for power or are reserved for future use. The eight data wires are used to carry eight bits of data in parallel. In general, conventional SCSI bus cables include either 8 or 16 data wires for carrying 8 or 16 bits, respectively, of data in parallel. The data wires in the bus thus define a datapath for communicating bits equal to the number of data wires in the bus.

A traditional SCSI bus may accommodate a plurality of SCSI devices up to a maximum number equal to the number of data bits in the SCSI bus. In practice, the width of the SCSI datapath is typically 8 or 16 bits corresponding to the number of data wires in the SCSI bus. This means the maximum number of SCSI devices, including a host adapter, that can be attached to a SCSI bus is limited to 8 or 16.

Conventional SCSI buses, however, are generally capable of transmitting signals reliably for a specified cable length only. For example, SCSI bus cables conforming to SCSI specifications are typically limited to a maximum length such as 3, 6, 12, or 25 meters, and the like. In modem computer systems such as servers that need to communicate with numerous SCSI devices, some SCSI peripheral devices may be located more than the specified cable length away from a host computer.

In such instances, an expander, which is essentially a repeater, is typically used to add another SCSI bus, which is then used to couple additional SCSI devices. FIG. 2 illustrates a conventional computer system 200 that includes an expander 214 for connecting two SCSI buses 208 and 210. In the computer system 200, a host computer 202 is coupled to the SCSI bus 208 via a SCSI host adapter 204. One or more SCSI devices 206 are coupled to the SCSI bus 208 while one or more SCSI devices 212 and enclosure chips 216 are coupled to the SCSI bus 210. The enclosure chips 216 are configured to control enclosure functions such as power control, temperature sensing, fan control, etc. The expander 214 is coupled between the SCSI buses 208 and 210 to regenerate signals received on either SCSI bus 208 or 210 for transmission to the other SCSI bus. In this configuration, the expander 214 functions to extend the length of the overall SCSI bus so that additional SCSI devices 212 or expanders can be attached to the SCSI bus 210. The SCSI devices 212 and 216 together with SCSI bus 210 are collectively referred to as a segment. Similarly, the host adapter 204, SCSI devices 208, and SCSI bus 210 collectively define another segment.

Unfortunately, however, conventional expanders are typically transparent devices without SCSI IDs of their own. This means that the expanders are not addressable and are thus invisible to SCSI protocol. Using such transparent expanders without dedicated SCSI IDs in an I/O subsystem presents several drawbacks. For example, individual segments of the I/O subsystem often need to be modified to isolate faulty cables, connections, drivers, and receivers. In addition, it is often desirable to communicate with individual expanders to determine optimum speed at which the expanders can communicate during domain validation. Because conventional expanders are not addressable, these modifications and domain validation processes may not be performed automatically without a system administrator.

One obvious solution would be to implement expanders like SCSI devices by adding SCSI controllers and assigning SCSI IDs used for SCSI devices. This solution, however, would reduce the number of addressable SCSI devices that can be attached to a SCSI I/O subsystem. Further, non-data SCSI devices such as enclosure chips need to be addressable for control and status functions. Using normal SCSI IDs for such addresses would further reduce the number of functional SCSI devices.

In view of the foregoing, what is needed is a method for assigning IDs to expanders and enclosure chips without using conventional SCSI IDs so as to allow addressing of individual expanders and/or enclosure chips.

SUMMARY OF THE INVENTION

The present invention fills these needs by providing methods for assigning addresses to expanded devices such as expanders, enclosure chips, terminators, or the like in a computer I/O subsystem. It should be appreciated that the present invention can be implemented in numerous ways, including as a process, an apparatus, a system, a device, a method, or a computer readable medium. Several inventive embodiments of the present invention are described below.

In one embodiment, the present invention provides a method for assigning addresses to expanders in a computer I/O subsystem. The I/O subsystem includes one or more buses with each bus having an N-bit data bus for communication. One or more expanders are provided in the computer I/O subsystem with each expander being arranged to couple a pair of buses for communicating data and control signals. An expander address space is defined for the expanders by partitioning an N-bit data bus into a pair of fields that includes an expander ID field and an expander signature field. An address is assigned to each of the expanders such that each address includes a common expander signature in the expander signature field and an expander ID in the expander ID field. Each address of the expanders is configured to have more than two bits are asserted.

In another embodiment, the present invention provides a method for assigning addresses to expanded devices in a computer I/O subsystem, which has one or more buses. Each bus has an N-bit data bus for communication. One or more types of expanded devices are provided in the computer I/O subsystem and are coupled to one or more peripheral buses. An expanded address space is defined for the one or more types of expanded devices by partitioning an N-bit data bus into a pair of fields that includes an expanded ID field and an expanded signature field. An address is assigned to each of the expanded devices by assigning an expanded signature to each type of the expanded devices. In addition, an expanded ID is assigned to each expanded device within each type of the expanded devices, wherein more than two bits are asserted in the address. Preferably, the addresses of the expanded devices are configured to encode a selection for selecting an expanded device, a broadcast function for broadcasting a command to all expanded devices with the same expanded signature, or a target function adapted to select one of the expanded device for performing a function.

Advantageously, the methods of the present invention allow expanded devices such as expanders, terminators, and enclosure chips to be attached to an I/O subsystem without using conventional one-bit device IDs. For example, the assignment of an ID with more than two bits asserted to individual expanded devices ensures that only expanded devices will respond to such an ID. That is, legacy SCSI devices will not respond when more than two bits are asserted on a SCSI data bus. In addition, the partition of each ID into an expanded signature and an expanded ID further allows addressing of devices in accordance with the device types. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention provides methods for assigning addresses to expanded devices in a computer I/O subsystem. It will be obvious, however, to one skilled in the art, that the present invention may be practiced without some or all of these specific details. In other instances, well known process operations have not been described in detail in order not to unnecessarily obscure the present invention.

The methods of the present invention are implemented in an I/O subsystem of a computer system to allow addressing of various types of expanded devices such as expanders, enclosure chips, terminators, etc. The I/O subsystem includes one or more buses having an N-bit datapath. One or more peripheral devices, each of which has a single bit SCSI ID, are coupled to a peripheral bus. An expanded address space of N-bit width is defined for the expanded devices by partitioning the N-bit into an expanded signature field and an expanded ID field. Then, a unique address is define for each expanded device by assigning an expander signature to each type of expanded devices and assigning an expander ID to individual expanded devices. Each address preferably defines an N-bit data pattern having more than two bits asserted to distinguish the expanded devices from peripheral devices. In this manner, the methods of the present invention allows addressing of expanded devices without using addresses reserved for conventional peripheral devices.

Figure 1:
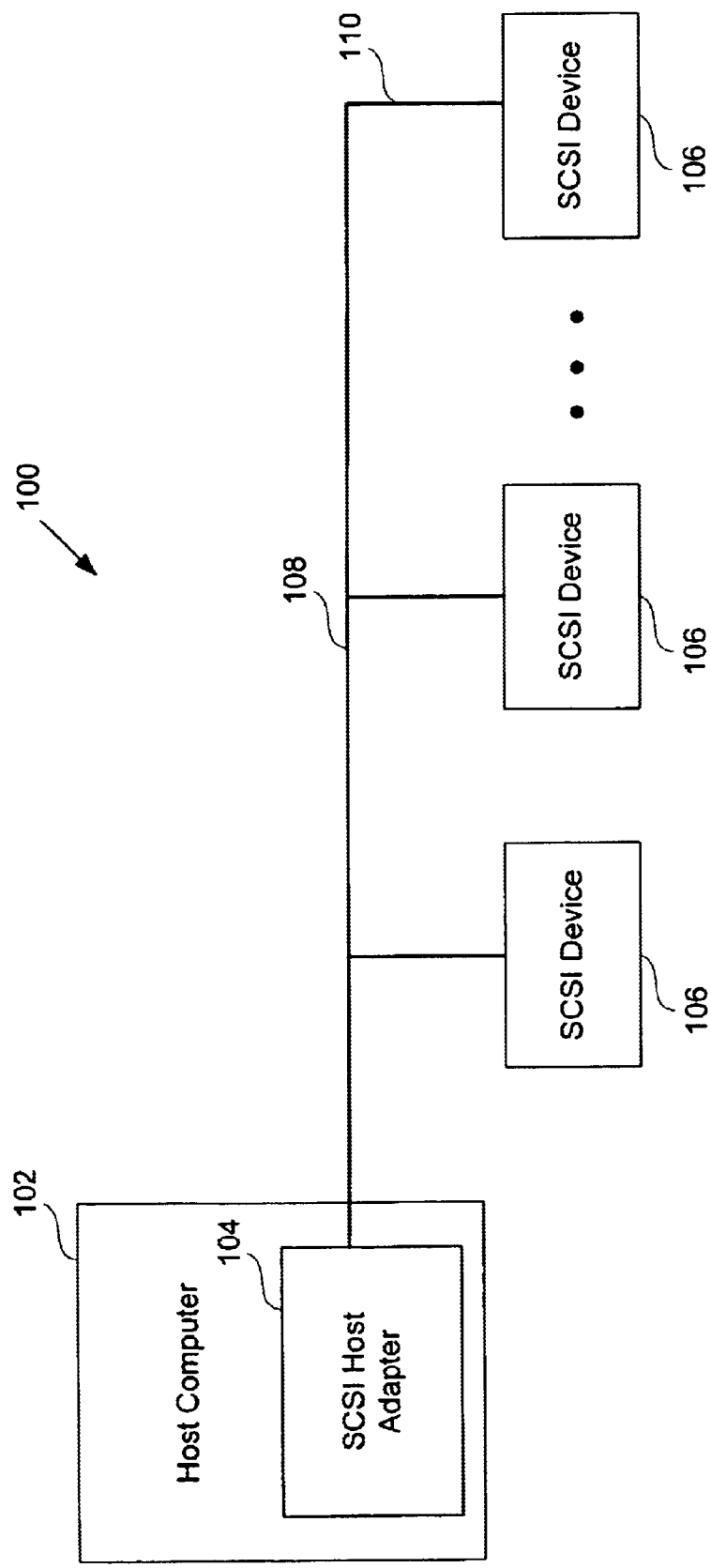
FIG. 1 shows a block diagram of a conventional computer system including a host computer, a plurality of SCSI devices, and a SCSI bus.
Figure 2:
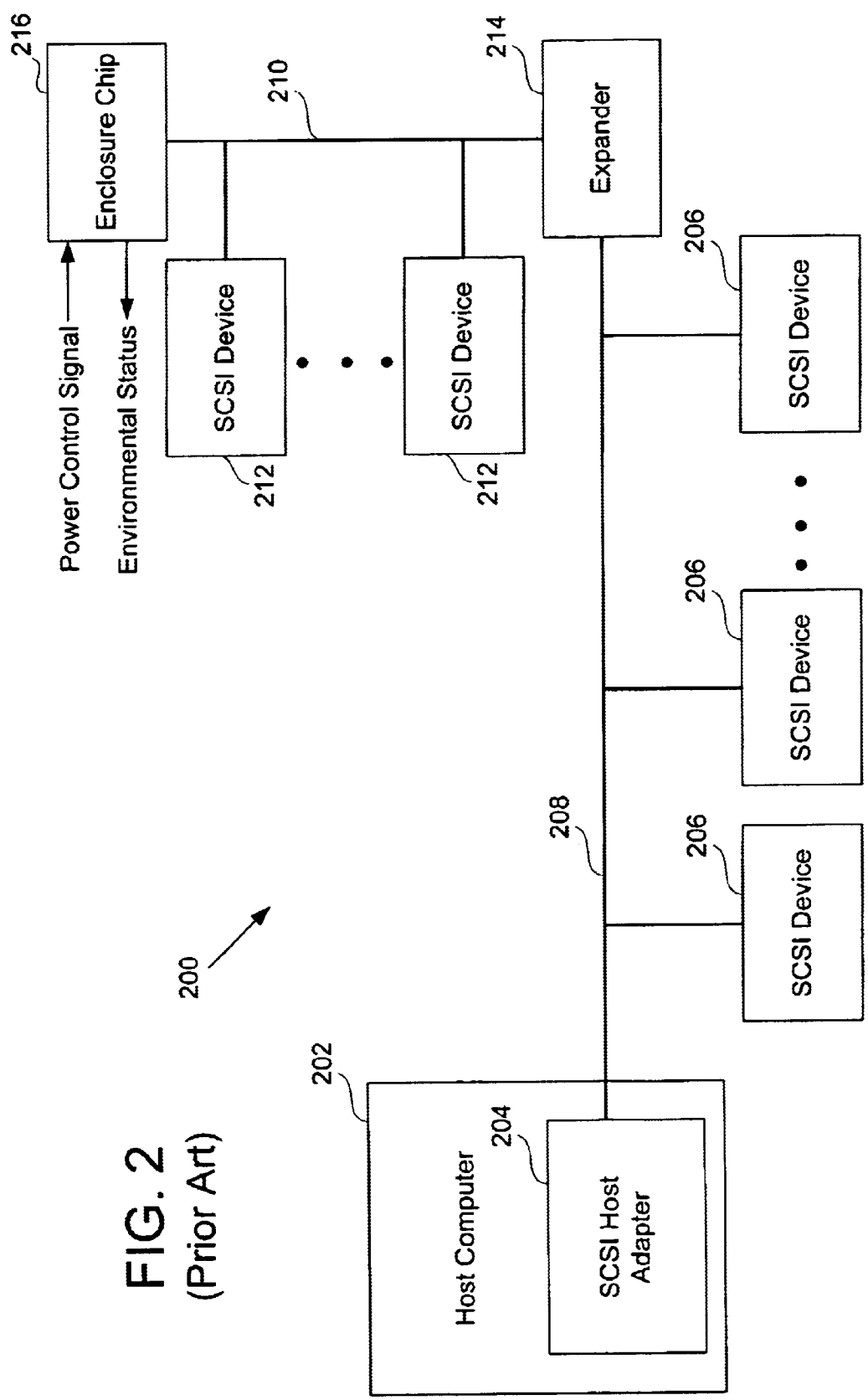
FIG. 2 illustrates a conventional computer system that includes an expander for connecting a pair of SCSI buses.
Figure 3A:
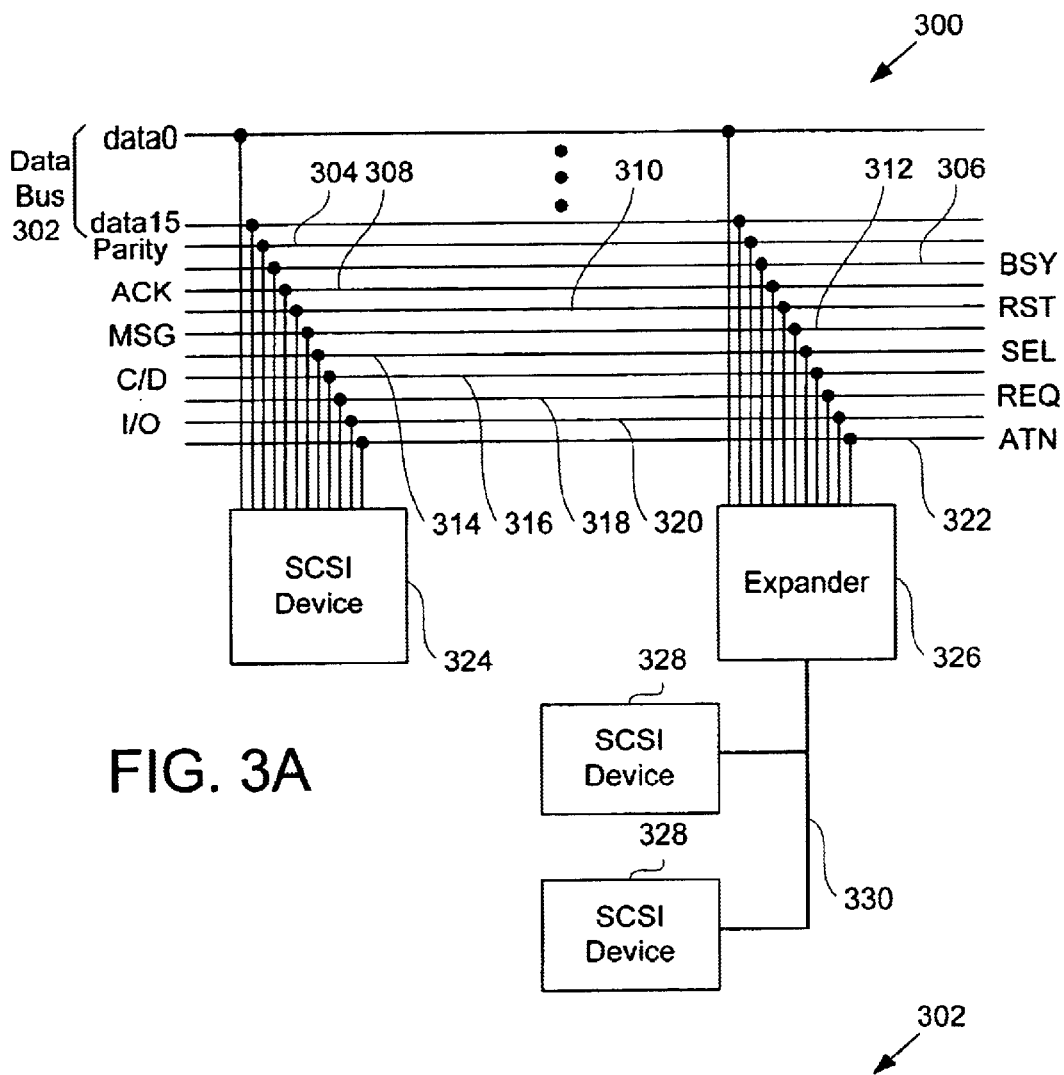
FIG. 3A illustrates a schematic diagram of an exemplary SCSI bus that is used to connect one or more SCSI devices and one or more expanders in accordance with one embodiment of the present invention.

FIG. 3A illustrates a schematic diagram of an exemplary SCSI bus 300 that is used to connect one or more SCSI devices 324 and one or more expanders 326 in accordance with one embodiment of the present invention. The SCSI bus 300 includes a set of electrical lines (e.g., wires) for carrying data and control signals. In this illustrated embodiment, a set of data lines 302 comprising data0 to data15 defines a datapath used for carrying data. A parity line 304 is provided in the bus 300 for transmitting a parity bit. In addition, a set of control lines 306, 308, 310, 312, 314, 316, 318, 320, and 322 is used to carry well known SCSI control signals BSY (busy), ACK (acknowledge), RST (reset), MSG (message), SEL (select), C/D (control/data), REQ (request), I/O (input/output), and ATN (attention), respectively. Table 1 shows these control signals and their functions.

TABLE 1

| SIGNAL | FUNCTION |
| --- | --- |
| BSY | Indicates whether the bus is currently busy. |
| SEL | Asserted by an initiator or target to select target or initiator, respectively. |
| C/D | Indicates whether control data is placed on the bus. |
| I/O | Indicates direction of data flow on the data bus relative to the initiator. |
| MSG | Activated by a target during a message phase. |
| REQ | Indicates data transfer handshake request by a target. |
| ACK | Indicates data transfer handshake acknowledge by an initiator. |
| ATN | Activated by an initiator to indicate an attention condition. |
| RST | Used to reset all connected SCSI devices. |

Although the SCSI bus 300 is illustrated with 16-bit data bus of 16-bit datapath, it may also be implemented using any N-bit data bus where N is an even number multiple of 2 such as 8, 16, 32, etc. In addition, it should be appreciated that that the present invention may be implemented using any SCSI protocols such as SCSI-1, SCSI-2, SCSI-3, and the like.

In conventional SCSI buses, a SCSI device address (i.e., ID) is a value corresponding to one of the bit positions on the data bus. Allowable device addresses on conventional SCSI buses range from 0 to 7 on an eight-bit bus and 0 through 15 on a wide (16-bit) bus. In a SCSI I/O subsystem with 16-bit SCSI data bus, for example, a host adapter may have a SCSI ID of "15" corresponding to data bus line (e.g., data15) while other SCSI devices may have a SCSI ID ranging from "0"0 to "14"(e.g., data0 to data 14). The SCSI IDs asserted on a SCSI bus serve to determine device priority during arbitration and to establish communications with another device during selection or reselection. SCSI protocols specifying the priority of SCSI IDs are well known in the art. For example, the priority of SCSI IDs ranging from 0 to 15, in the order from highest to lowest priority, may be 7, 6, 5, 4, 3, 2, 1, 0, 15, 14, 13, 12, 11, 10, 9, and 8.

During a SCSI arbitration phase, a SCSI device contends for the SCSI bus by asserting a data bit line corresponding to its SCSI ID. When several devices are arbitrating for the bus, relative bit positions of the contending devices are used to determine which device wins the arbitration. That is, the contending device with the highest priority SCSI ID wins the arbitration. Upon winning arbitration, the winning device asserts, as an initiator, the SCSI ID of a target device on the data bus. Thus, at this time, the SCSI IDs of both the initiator and target are asserted. This, in turn, means that only two data bus lines corresponding to the SCSI IDs of the initiator and target are asserted on the SCSI bus. The target device corresponding to the asserted SCSI ID of the target then responds by asserting a SEL signal on the SCSI bus and gains control of the bus for communication with the initiator.

In the conventional SCSI protocols, the selection or reselection of a target device requires assertion of only two data bus lines corresponding to the SCSI IDs of the initiator and the target device. If more than two data bus lines are asserted, the target device does not respond to the initiator's selection or reselection attempt because it will not recognize the assertion of more than two data bus lines as valid selection or reselection protocol.

The present invention provides methods for assigning IDs to expanders to allow addressing of the expanders without using conventional SCSI IDs. Specifically, given that a SCSI bus has an N-bit datapath corresponding to N data lines in the SCSI bus, the present invention defines the expanded address space for addressing expanders and/or other devices by partitioning the N data bits in the datapath of the SCSI bus into two components: an expanded ID (XID) field and an expanded signature (XSIG) field. Preferably, the datapath is partitioned equally so that the expanded ID field and the expanded signature field are N/2 bits each. In addition, an address for an expander or other device is comprised of more than two bits asserted on the data lines of the SCSI bus so that conventional SCSI devices do not respond when an expander is being selected.

Figure 3B:
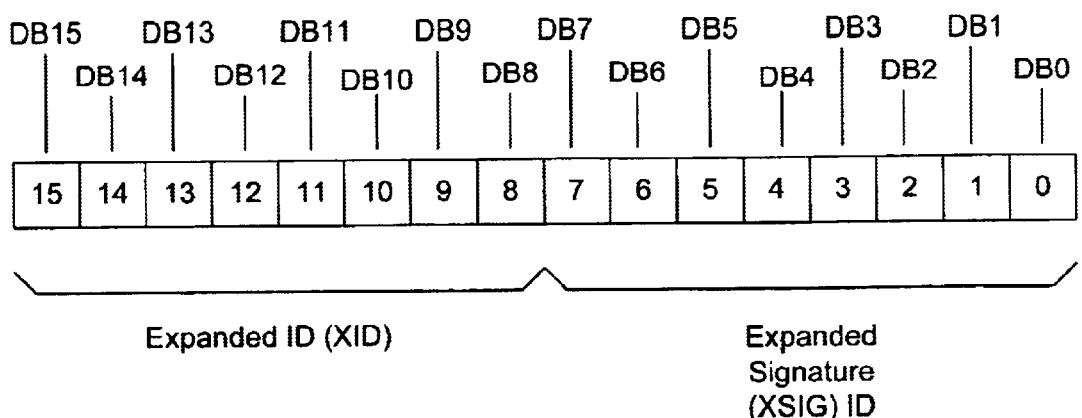
FIG. 3B shows a schematic diagram of a 16-bit datapath of the SCSI data bus partitioned to provide expanded addressing capability in accordance with one embodiment of the present invention.

FIG. 3B shows a schematic diagram of the 16-bit datapath of the SCSI data bus 302 partitioned to provide expanded addressing capability in accordance with one embodiment of the present invention. The partitioning of the datapath involves dividing the 16 bits (i.e., bit 0 to bit 15 or DB0 to DB15) into an 8-bit expanded ID field and an 8-bit expanded signature field. The 8-bit expanded ID is thus defined by the bits DB8 to DB15 while the 8-bit expanded signature corresponds to the bits DB0 to DB7. In this scheme, the lower 8-bit expanded signature is used to identify a device as an expander while the higher 8-bit expanded ID is used to uniquely identify individual expanders. In addition to identifying expanders, the expanded signature field may also be used to identify difference types or categories of SCSI devices such as expanders, enclosure chips, terminators, etc. In such instances, different expanded signatures may be assigned to expanders, enclosure chips, and terminators.

The addressing of expanders is performed by extending conventional SCSI addressing during selection phase based on the fact that a legacy SCSI target device of a selection will only respond to a certain set of ID bits asserted on a SCSI data bus. That is, standard SCSI devices respond only when two bits corresponding to the IDs of the initiator and their own ID are asserted on the SCSI data bus.

To assign SCSI IDs to expanders without using conventional SCSI IDs, each SCSI ID of the expanders is configured to have more than two bits asserted on the SCSI data bus. This ensures that conventional SCSI devices do not respond when selecting expanders. In one embodiment, SCSI expanders are configured to respond to a selection with five or more bits asserted. For example, five bits may be asserted in expanded signature field and one to seven bits may be asserted in the expander ID field. The five bits in the expanded signature field ensure that neither standard nor extended address SCSI devices will consider the SCSI expander selection address as being valid. Extended addressing of SCSI devices is described in U.S. patent application Ser. No. 09/636,038, entitled "Methods for Addressing Extended Number of Peripheral Devices over Peripheral Bus," by Charles A. Monia et al. and is incorporated herein by reference.

The expanded signature is assigned a pattern that will not be mistaken by a legacy device. In one embodiment, the expanded signature pattern is configured to have at least three bits asserted to prevent a legacy SCSI device from recognizing the selection IDs as being valid. More preferably, the expanded signature pattern includes at least five asserted bits to operate properly with extended addressing of SCSI devices described above. Table 2 shows an exemplary set of possible 8-bit expanded signatures in hexadecimal numbers that can be assigned to expanders for a 16-bit SCSI data bus in accordance with one embodiment of the present invention. The 8-bit expanded signatures in Table 2 are organized according to the number of bits asserted (x,y) in the two 4-bit blocks making up the 8-bit number.

TABLE 2

| Expanded Signature (1, 4) | Expanded Signature (2, 3) | Expanded Signature (3, 2) | Expanded Signature (4, 1) |
|---|---|---|---|
| 1Fh | 37h | 73h | F1h |
| 2Fh | 3Bh | 75h | F2h |
| 4Fh | 3Dh | 76h | F4h |
| 8Fh | 3Eh | 79h | F8h |
|  | 57h | 7Ah |  |
|  | 5Bh | 7Ch |  |
|  | 5Dh | B3h |  |
|  | 5Eh | B5h |  |
|  | 67h | B6h |  |
|  | 6Bh | B9h |  |
|  | 6Dh | BAh |  |
|  | 6Eh | BCh |  |
|  | 97h | D3h |  |
|  | 9Bh | D5h |  |
|  | 9Dh | D6h |  |
|  | 9Eh | D9h |  |
|  | A7h | DAh |  |
|  | ABh | DCh |  |
|  | ADh | E3h |  |
|  | AEh | E5h |  |
|  | C7h | E6h |  |
|  | CBh | E9h |  |
|  | CDh | EAh |  |
|  | CEh | ECh |  |

In the 16-bit SCSI bus datapath, the expanded ID in the expanded ID field is a binary number from 00h through FFh. Each of the expanded devices is assigned a unique expander ID to allow individual addressing of the expanded devices. Table 3 defines exemplary expanded IDs in hexadecimal numbers that can be used with any valid expanded signature in accordance with one embodiment of the present invention.

TABLE 3

| Expanded ID | Selection Description |
|---|---|
| 00-0F | Select an individual expanded device from 00 to 0F |
| 10-1F | Reset an individual expanded device from 00 to 0F |
| 20 | Reset all expanded devices from 00 through 0F |
| 21-FF | Reserved |

For each valid expanded signature, expanded IDs may be used for selection of expanded devices. As shown in Table 3, each expanded ID between 00 and 0F, for example, allows selection of an individual expanded device with the same expanded ID. The expanded IDs may also be used to specify a target function for a valid expander signature. An expanded ID between 10 and 1F, for instance, specifies resetting of an individual expanded device with the identical expanded ID. In addition, expanded IDs can also be used to specify a broadcast function. For example, all expanded devices from 00 through 0 F may be reset in response to an expanded ID of 20. Other expanded IDs in Table 3 are reserved. However, it should be appreciated that any of the reserved expanded IDs may be defined to specify other types of selections, broadcast functions, or target functions.

Figure 4:
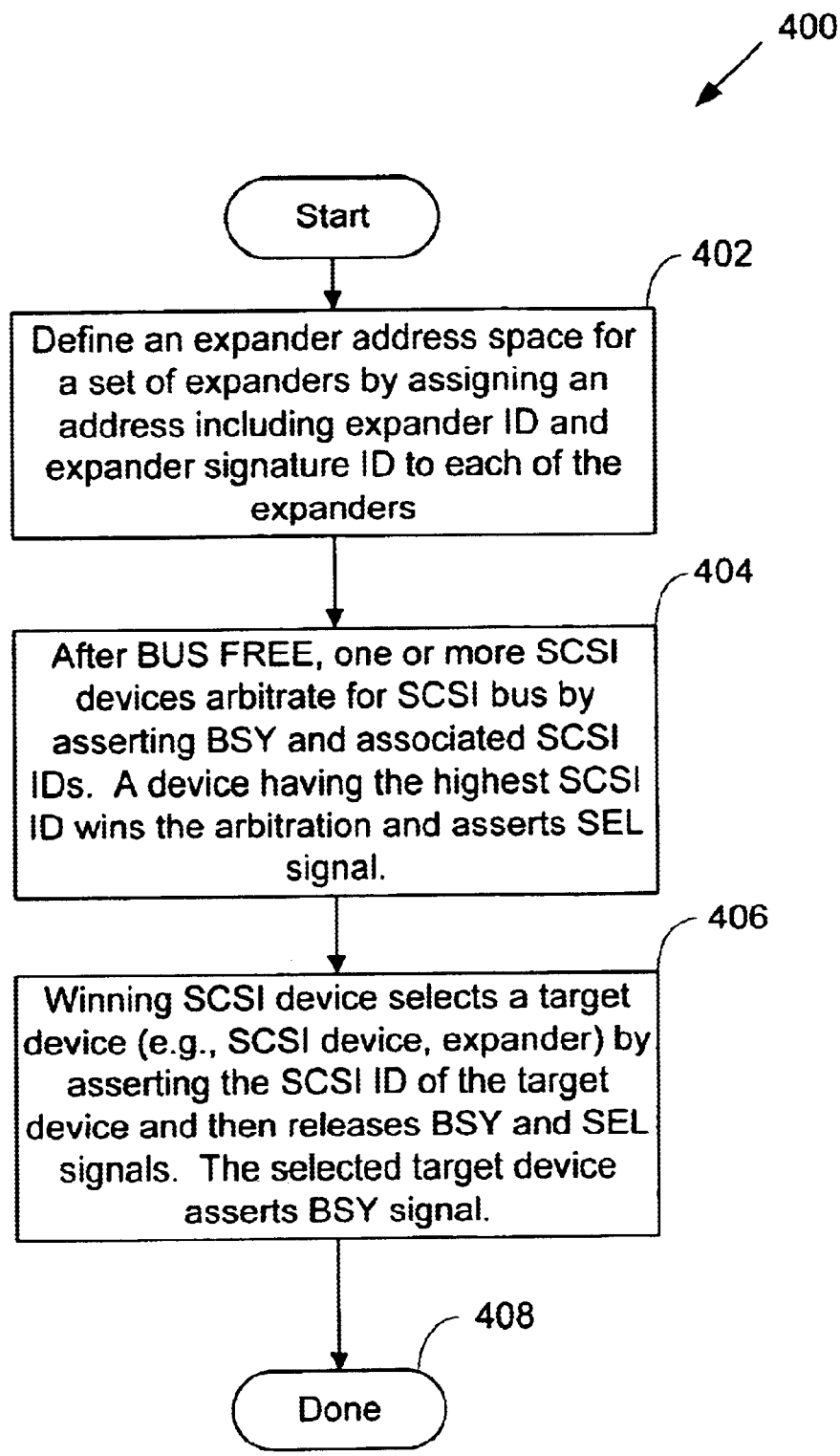
FIG. 4 shows a flowchart of an exemplary method for addressing expanded devices in an I/O subsystem in accordance with one embodiment of the present invention.

FIG. 4 illustrates a flowchart of an exemplary method 400 for addressing expanded devices in an I/O subsystem in accordance with one embodiment of the present invention. The expanded devices may include expanders, terminators, enclosure chips, and any other devices that can be defined under the expanded addressing scheme of the present invention. In this method, an expanded address space is defined, in operation 402, for expanded devices by assigning an address including an XSIG and an XID to each of the expanded devices such that more than two bits are asserted in each address, with preferably at least two bits being asserted in each XSIG.

After BUS FREE, one or more SCSI devices arbitrate for SCSI bus in operation 404 by asserting BSY and associated SCSI IDs. In this operation, a device having the highest SCSI ID wins the arbitration and asserts SEL signal. The winning SCSI device then selects a target device (e.g., SCSI device, expanded device, etc.) for communication by asserting an address of the target device and then releases BSY and SEL signals in operation 406. In response, the target device asserts BSY signal. The method then terminates in operation 408.

The embodiments illustrated herein describe an initiator arbitrating for the bus to select a target in a selection phase. However, it should be noted that the target may also arbitrate for the bus to reselect an initiator in a reselection phase. The reselection operations are performed in the same manner described for the selection operations except for the state of the I/O signal. Accordingly, it should be borne in mind that the operations described for selection methods apply equally well to the reselection methods.

Figure 5A:
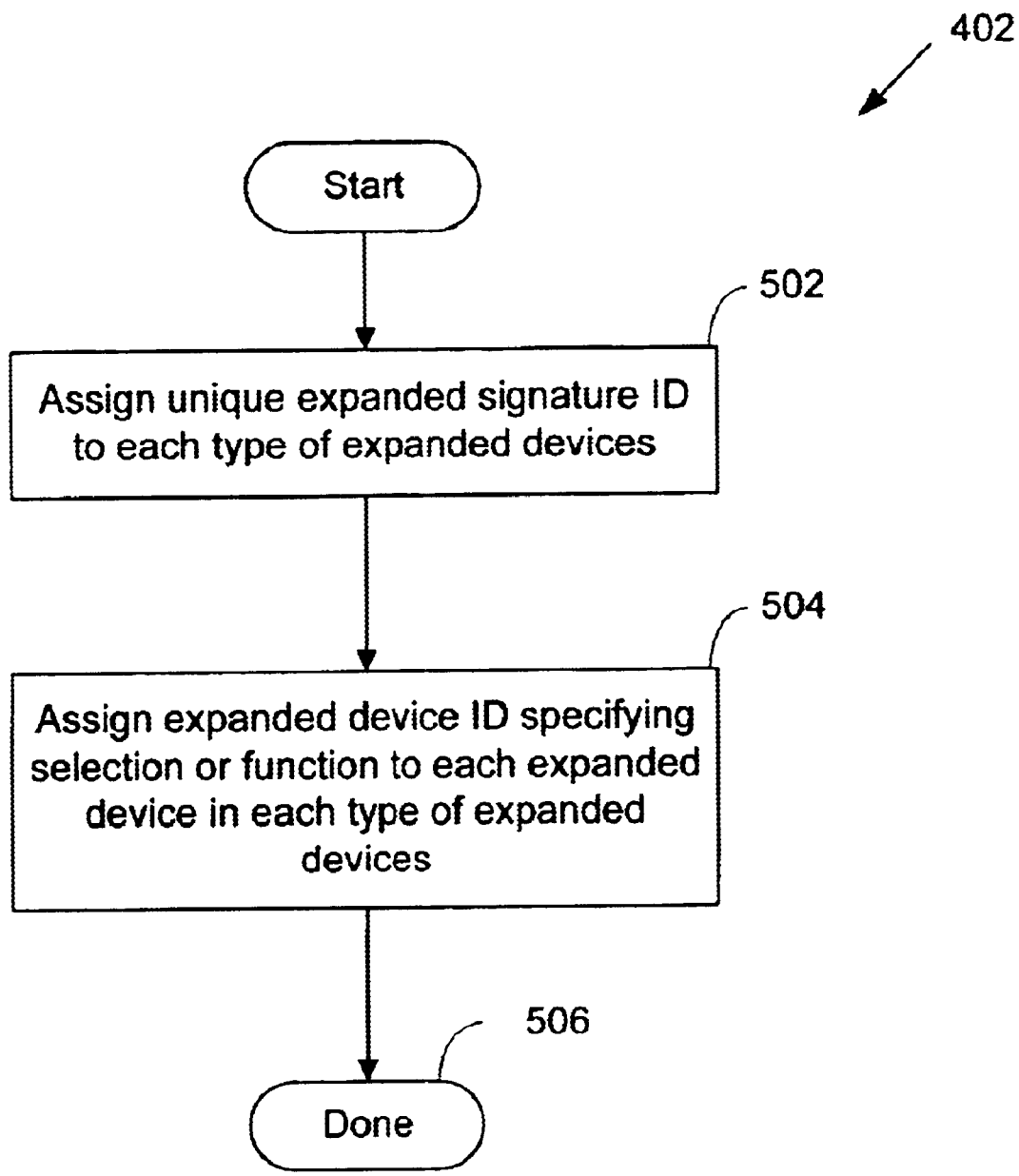
FIG. 5A shows a more detailed flowchart of an operation for assigning an address for one or more types of expanded devices in accordance with one embodiment of the present invention.

In a preferred embodiment, the expanded address space may be defined for one or more types of expanded devices. Types of expanded devices may include expanders, terminators, enclosure chips, etc. FIG. 5A shows a more detailed flowchart of the operation 402 for assigning addresses for one or more types of expanded devices in accordance with one embodiment of the present invention. In operation 502, a unique XSIG is assigned to each type of expanded devices to uniquely identify the type of devices. By way of example, expanders, terminators, and enclosure chips may be assigned XSIGs of 7Ah, 37h, and 3Dh, respectively. In a preferred embodiment, at least two bits are asserted in each of the assigned expanded device signatures.

After assigning expander signatures for each of the expanded device types, an XID specifying selection or function is assigned to each of the expanded devices within each device type in operation 504. For example, the XID of an expanded device specifies selection or function (e.g., broadcast or target function) as discussed above in Table 3. For selection of individual devices within a type of expanded devices, each expanded device is assigned an XID. In addition, one or more XIDs may also be used for broadcast selection of all devices within a specified type of expanded devices or for target functions as described above in conjunction with Table 3. For instance, an XID value of F5h and expander signature value of A7h can be used to select all expanders for broadcast communication. Similarly, terminators and enclosure chips may also be configured to recognize a specified XID value for broadcast communication.

Figure 5B:
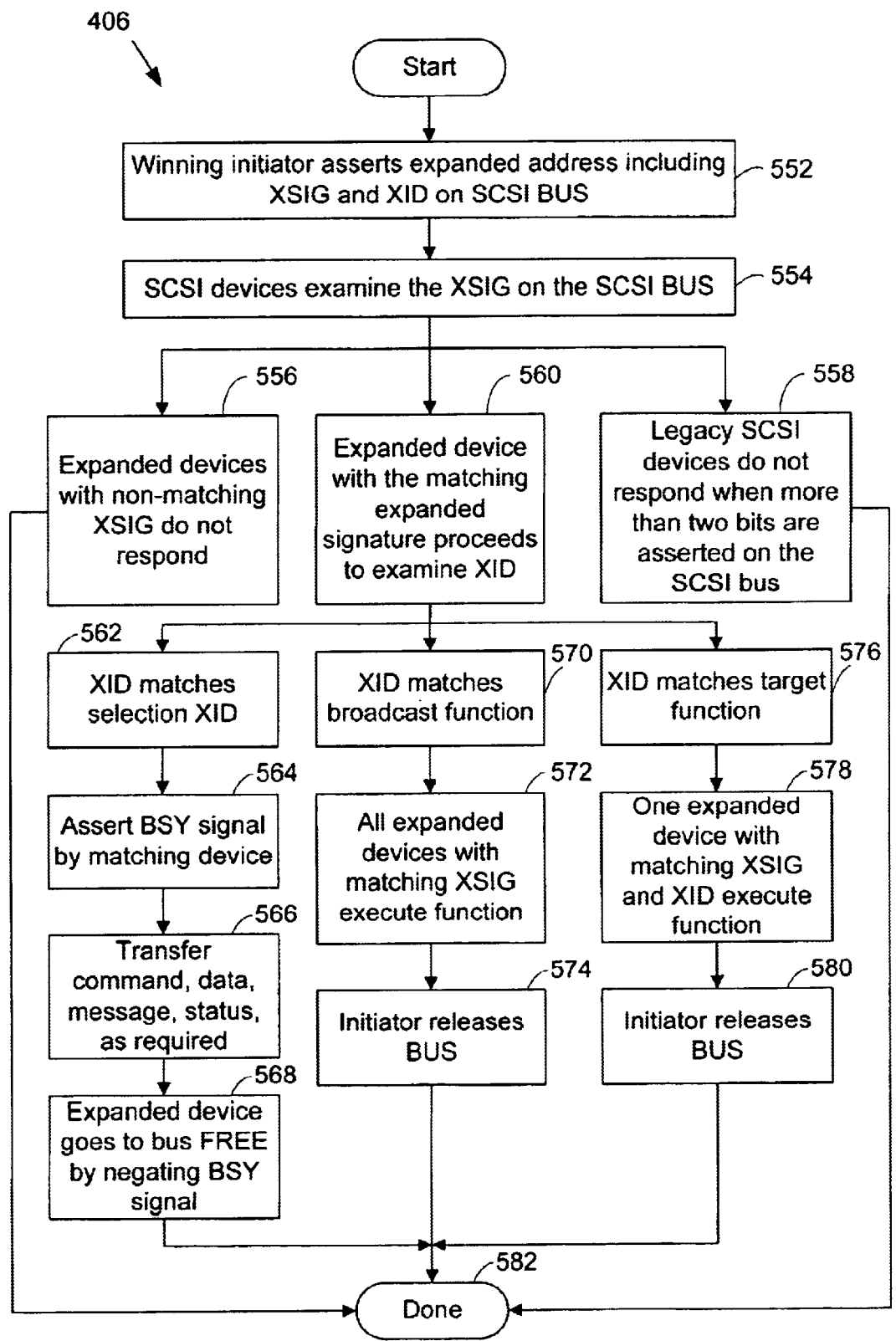
FIG. 5B shows a more detailed flowchart of an operation for selecting one or more expanded target device for communication in accordance with one embodiment of the present invention.

FIG. 5B shows a more detailed flowchart of the operation 406 for selecting one or more expanded target devices for communication in accordance with one embodiment of the present invention. In operation 552, the winning device of arbitration, as an initiator, asserts an expanded address including XSIG and XID signals on SCSI bus such that more than two bits are asserted on the SCSI bus. Each device then examines the address including expanded signature and XID that are asserted on the SCSI bus in operation 554.

Upon examining the expanded signature, expanded devices with non-matching signature do not respond in operation 556 because they do not belong to the expanded device type associated with the asserted signature. Similarly, legacy SCSI devices do not respond as shown in operation 558 because more than two bits are asserted on the bus. In both cases, the method terminates in operation 582.

On the other hand, expanded devices with the matching signature continue for further processing in operation 560. In one scenario, if the XID of an expanded device matches the selection XID asserted on the bus in operation 562, the matching expanded device asserts BSY signal on the SCSI bus in operation 564. Then, information such as command, data, message, status, etc. as required is transferred to or from the selected expanded device in operation 566. The expanded device then negates BSY signal on the bus to go BUS FREE in operation 568.

In another case, if the XID asserted on the bus matches a broadcast function in operation 570, all expanded devices with the matching expanded signature executes the broadcast function in operation 572. When all devices have executed the broadcast function, the initiator releases the bus in operation 574.

On the other hand, if the XID asserted on the bus matches a target function in operation 576, an expanded device having the matching expanded signature and XID executes the target function in operation 578. When the device completes the execution of the target function, the initiator releases the bus in operation 574. The method then terminates in operation 582.

The expanded arbitration and selection of the present invention may implement any various timing schemes. By way of example, the expanded arbitration and selection proceeds according to conventional SCSI arbitration and selection protocol up to the point where the initiating device negates BSY signal. At this point, the initiator may assert its own ID and the target ID for a total of two asserted bits on the SCSI data bus to select a legacy target device. To select an expanded device, on the other hand, the initiator asserts XID and XSIG of the expanded device on the SCSI data bus.

To implement a broadcast function to a type of expander devices, the expander devices are configured to accept the broadcast data within a specified time after BSY signal has been negated by an initiator. For a broadcast selection, for example, the initiator may wait for three bus settle delays after the BSY signal is negated. At this time, the initiator negates SEL and stops driving the SCSI data bus with XSIG and XID signals. The expanders sample the XID value to determine a command within the three bus settle delays.

Thus, the methods of the present invention allow assignment of addresses to expanded devices such as expanders, enclosure chips, and terminators within an I/O subsystem without using conventional one-bit device IDs. The assignment of an address with more than two bits asserted to individual expanded devices ensures that only expanded devices will respond to such an ID. On the other hand, legacy SCSI devices will not respond when more than two bits are asserted on a SCSI data bus.

In addition, the partitioning of the N-bit data bus into an expanded signature field and an expanded ID field allows encoding of substantial number of expanded signatures and expanded IDs. For example, for a 16-bit SCSI data bus, an 8-bit expanded signature field allows encoding of up to 256 different types of devices (219 when 3 or more bits are asserted) while an 8-bit expanded ID field provide up to 256 unique device addresses within each device type. Moreover, the methods of the present invention allow encoding of expanded addresses to provide a selection for selecting an individual expanded device, a broadcast function for broadcasting a command to all expanded devices within the same type of expanded devices, or a target function adapted to select one of the expanded devices executing a specified function.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for assigning addresses to expanders in a computer I/O subsystem, the I/O subsystem having one or more buses, each bus having an N-bit data bus for communication, the method comprising:

providing one or more expanders in the computer I/O subsystem, each expander being arranged to couple a pair of buses for communicating data and control signals;

defining an expander address space for the expanders by partitioning an N-bit data bus into a pair of fields that includes an expander ID field and an expander signature field; and assigning an address to each of the expanders, each address including a common expander signature in the expander signature field and an expander ID in the expander ID field, wherein more than two bits are asserted in the assigned address of each of the expanders.

2. The method as recited in claim 1, wherein the addresses of the expanders are configured to encode a selection for selecting an expander, a broadcast function for broadcasting a command to all expanders, and a target function adapted to select one of the expanders for performing a function.

3. The method as recited in claim 1, wherein the address for each of the expanders is assigned such that more than two bits are asserted in each expander signature.

4. The method as recited in claim 1, wherein all the expanders share the common expander signature for identifying the expanders.

5. The method as recited in claim 1, wherein N is an integer multiple of 8.

6. A method for assigning addresses to expanders in a computer I/O subsystem, the I/O subsystem having one or more buses, each bus having an N-bit data bus for communication, the method comprising:

providing one or more expanders in the computer I/O subsystem, each expander being arranged to couple a pair of buses for communicating data and control signals;

defining an expander address space for the expanders by partitioning an N-bit data bus into a pair of fields that includes an expander ID field and an expander signature field;

assigning an address to each of the expanders, each address including a common expander signature in the expander signature field and an expander ID in the expander ID field, wherein more than two bits are asserted in the assigned address of each of the expanders; and providing a set of peripheral devices coupled to the buses, each of the peripheral device having an one-bit address corresponding to one of the N bits in the N-bit data bus, wherein each peripheral device is configured to respond to an initiating device only when two bits corresponding to its own address and an address of the initiating device are asserted on the N-bit data bus.

7. The method as recited in claim 6, wherein the buses are SCSI buses and the peripheral devices are SCSI devices.

8. The method as recited in claim 6, wherein all the expanders are configured to receive and execute a broadcast command from the initiating device.

9. The method as recited in claim 8, wherein the expanders executes the broadcast command in response to a specified expander ID and the common expander signature.

10. A method for assigning addresses to expanded devices in a computer I/O subsystem, the I/O subsystem having one or more buses, each bus having an N-bit data bus for communication, the method comprising:
providing one or more types of expanded devices in the computer I/O subsystem coupled to one or more peripheral buses;
defining an expanded address space for the one or more types of expanded devices by partitioning an N-bit data bus into a pair of fields that includes an expanded ID field and an expanded signature field; and
assigning an address to each of the expanded devices by:
assigning an expanded signature to each type of the expanded devices; and
assigning an expanded ID to each expanded device within each type of the expanded devices, wherein more than two bits are asserted in the address including the assigned expanded signature and expanded ID for each of the expanded devices.

11. The method as recited in claim 10, wherein the addresses of the expanded devices encode a selection for selecting an expanded device, a broadcast function for broadcasting a command to all expanded devices within a type of expanded devices, or a target function adapted to select a single expanded device within a type of expanded devices for performing a function.

12. The method as recited in claim 10, wherein the address for each of the expanded devices is assigned such that more than two bits are asserted in each expanded signature.

13. The method as recited in claim 10, wherein N is an integer multiple of 8.

14. The method as recited in claim 11, wherein the types of expanded devices are expanders, enclosure chips, or terminators.

15. The method as recited in claim 14, wherein each expander is arranged to couple a pair of buses for communicating data and control signals.

16. A method for assigning addresses to expanded devices in a computer I/O subsystem, the I/O subsystem having one or more buses, each bus having an N-bit data bus for communication, the method comprising:
providing one or more types of expanded devices in the computer I/O subsystem coupled to one or more peripheral buses;
defining an expanded address space for the one or more types of expanded devices by partitioning an N-bit data bus into a pair of fields that includes an expanded ID field and an expanded signature field; and
assigning an address to each of the expanded devices by:
assigning an expanded signature to each type of the expanded devices;
assigning an expanded ID to each expanded device within each type of the expanded devices, wherein more than two bits are asserted in the address including the assigned expanded signature and expanded ID for each of the expanded devices; and
providing a set of peripheral devices coupled to the buses, each of the peripheral device having a one-bit ID corresponding to one of the N bits in the N-bit data bus, wherein each peripheral device is configured to respond to an initiating device only when two bits corresponding to its own address and the address of the initiating device are asserted on the N-bit data bus.

17. The method as recited in claim 16, wherein the buses are SCSI buses and the peripheral devices are SCSI devices.

18. The method as recited in claim 16, wherein each of the expanded devices is configured to receive a broadcast command from the initiating device.

19. The method as recited in claim 18, wherein the expanded devices within a specified type of expanded devices are configured to receive and execute the broadcast command in response to a specified expanded ID and the expanded signature.

20. A method for assigning expanded addresses to expanded SCSI devices in an I/O subsystem, the I/O subsystem including one or more SCSI buses, each bus having an N-bit data bus for communication, the method comprising:
providing one or more types, of expanded SCSI devices in the I/O subsystem coupled to one or more SCSI buses;
defining an expanded address space for the one or more types of expanded SCSI devices by partitioning the N-bit data-bus into a pair of fields that includes an expanded ID field and an expanded signature field; and
assigning an expanded address to each of the expanded SCSI devices by:
for each type of the expanded SCSI devices, assigning a common expanded signature to each expanded SCSI devices within the each type of the expanded devices; and
assigning an unique expanded ID to each expanded SCSI device within the each type of the expanded SCSI devices, wherein more than two bits are asserted in the combined ID of the expanded signature and expanded ID.

21. The method as recited in claim 20, wherein the addresses of the expanded SCSI devices encode a selection for selecting an expanded SCSI device, a broadcast function for broadcasting a command to all expanded SCSI devices within a type of expanded devices, or a target function adapted to select a single expanded device within a type of expanded SCSI devices for performing a function.

22. The method as recited in claim 20, wherein the address for each of the expanded devices is assigned such that more than two bits are asserted in each expanded signature.

23. The method as recited in claim 20, wherein the types of expanded devices are expanders, enclosure chips, or terminators.

24. The method as recited in claim 20, wherein N is an integer multiple of 8.

25. The method as recited in claim 23, wherein each expander is arranged to couple a pair of SCSI buses for communicating data and control signals.

26. A method for assigning expanded addresses to expanded SCSI devices in an I/O subsystem, the I/O subsystem including one or more SCSI buses, each bus having an N-bit data bus for communication, the method comprising:

providing one or more types of expanded SCSI devices in the I/O subsystem coupled to one or more SCSI buses;

defining an expanded address space for the one or more types of expanded SCSI devices by partitioning the N-bit data bus into a pair of fields that includes an expanded ID field and an expanded signature field; and assigning an expanded address to each of the expanded SCSI devices by:

for each type of the expanded SCSI devices, assigning a common expanded signature to each expanded SCSI devices within the each type of the expanded devices;

assigning an unique expanded ID to each expanded SCSI device within the each type of the expanded SCSI devices, wherein more than two bits are asserted in the combined ID of the expanded signature and expanded ID; and providing a set of peripheral SCSI devices coupled to the buses, each of the peripheral SCSI device having a one-bit ID corresponding to one of the N bits in the N-bit data bus, wherein each peripheral SCSI device is configured to respond to an initiating device only when two bits corresponding to its own address and the address of the initiating device are asserted on the N-bit data bus.

27. The method as recited in claim 26, wherein each of the expanded SCSI devices is configured to receive a broadcast command from the initiating device.

28. The method as recited in claim 27, wherein the expanded SCSI devices within a specified type of expanded SCSI devices are configured to receive and execute the broadcast command in response to a specified expanded ID and the expanded signature.

* * * * *